United States Patent [19]

Rumpf

[11] 4,167,277
[45] Sep. 11, 1979

[54] SNAP-IN RETRACTOR

[75] Inventor: Robert J. Rumpf, Grosse Pointe, Mich.

[73] Assignee: The Firestone Tire & Rubber Company, Akron, Ohio

[21] Appl. No.: 801,474

[22] Filed: May 31, 1977

[51] Int. Cl.$^2$ ............................................. B60R 21/02
[52] U.S. Cl. .................................. 280/807; 296/24 R
[58] Field of Search ............ 280/744, 747; 296/24 R, 296/26; 242/107.4 R, 107.4 J, 107.4 E, 86; 160/29, 30

[56] References Cited

U.S. PATENT DOCUMENTS

| 1,599,581 | 9/1926 | Miller et al. | 242/86 |
| 3,659,800 | 5/1972 | Meyer | 242/107.4 C X |
| 3,695,545 | 10/1972 | Peters | 242/107.4 C X |
| 3,848,888 | 11/1974 | Kazaoka | 280/744 |
| 3,908,928 | 9/1975 | Okada | 280/744 X |
| 3,963,193 | 6/1976 | Higbee et al. | 242/107.4 A |
| 4,045,079 | 8/1977 | Arlanskas | 242/107.4 A X |

Primary Examiner—Richard A. Bertsch
Assistant Examiner—Norman L. Stack, Jr.
Attorney, Agent, or Firm—Miller, Morriss and Pappas

[57] ABSTRACT

An automotive seat belt retractor accessory frame is provided with a journal groove on one side which is engageable with one end of a structural pocket formed in an automobile for receiving the retractor. On the other side of the retractor frame and away from the journal groove is a stop usually formed as an integral extension of the flanges of the retractor frame. The stop is buttress engaging another edge of the pocket or opening and as the retractor frame is tilted into the pocket journalled at the groove and against one edge of the pocket, the retractor frame is stopped from further swing. A latch member secured to the retractor ramped to open upon passing engagement with the edge of the pocket and closes after the edge of the pocket has engaged the stop. The latch element, upon closing, is locked and the frame cannot be removed until a selected manual bias is applied through the pocket for release of the frame. Upon assembly in an automobile, the retractor mounted in the retractor frame is tilted and snapped into position.

8 Claims, 3 Drawing Figures

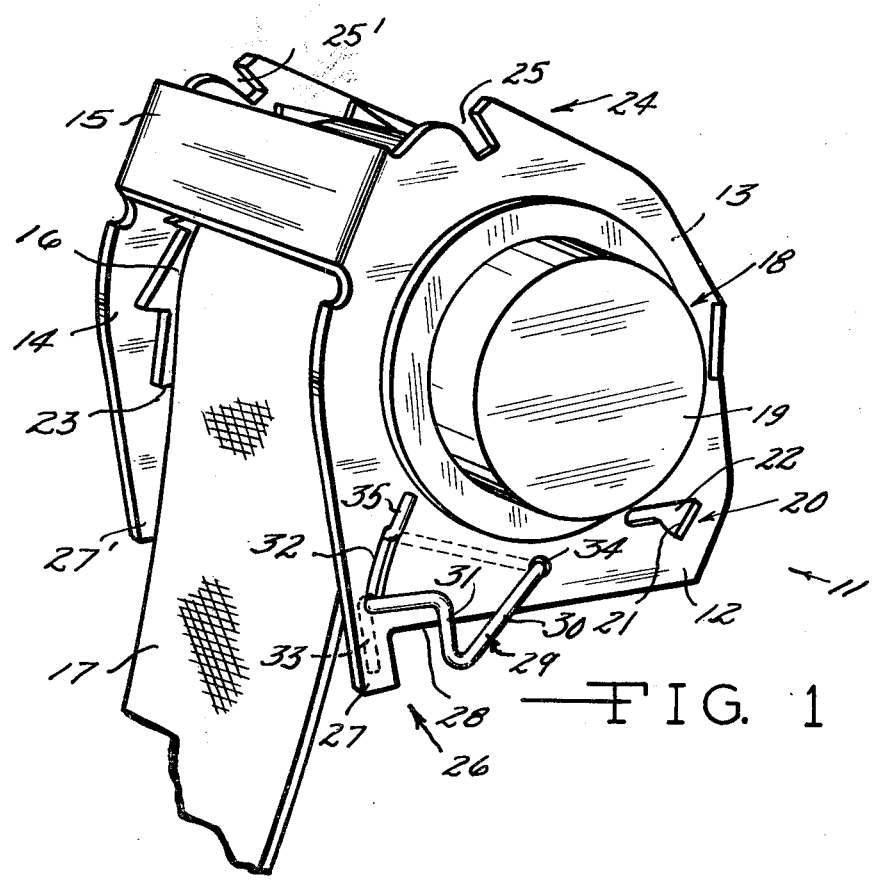
FIG. 1
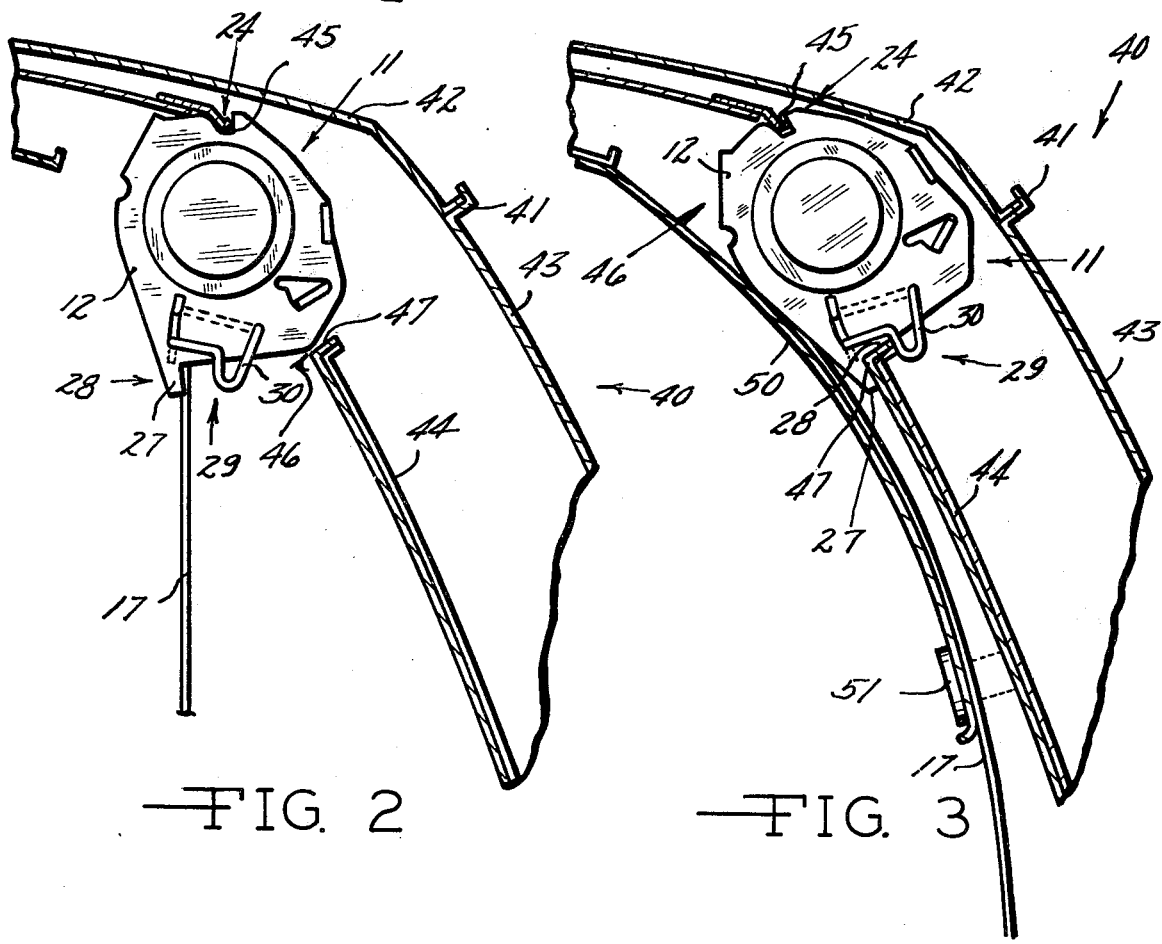
FIG. 2
FIG. 3

SNAP-IN RETRACTOR

BACKGROUND OF THE INVENTION

Accessories such as seat belt retractors for automotive safety applications have been in use for a substantial period of time in the automotive industry. In general, they comprise a frame, a spool or reel for winding webbing or cable thereon and some form of stop or lock means selectively assuring that under emergency condition the spool or webbing is stopped against further withdrawal. The retractor also rewinds the webbing neatly when it is not in use by means of a spring motor also supported by the retractor frame. Examples of such retractors are to be found in the U.S. Pat. Nos. 3,667,698 to Robert C. Fisher (Automatic Locking Retractor), 3,865,329 to Wallace C. Higbee, et al (Webbing Sensitive Inertial Retractors), and 3,963,193 to Wallace C. Higbee, et al (Vehicle Sensitive Inertial Retractors). There are variants of these with variant sensing and operating means but the feature common to all is the need for attachment of the retractors in the automobile. Usually the channel shaped frames have been secured by their webs as by bolts, welding, or the like structural portions of the vehicle as the frame chassis rail or door pillars and posts. While usually protected by cover boots, the units project into the useful cavity of the vehicle and require time consuming assembly.

The present invention is directed at simplifying installation of seat belt retractors and such automotive accessories by providing a snap-in installation for use in prepositioned pockets provided in the structural portions of the vehicle or automobile. In use after installation, the accessory retractors are not removable until separate trip means are provided to unlatch the frame of the retractor or other appliance. Cosmetic covers, guides, and upholstery cover the pocket and guide the webbing without exaggerated protuberance into the vehicle interior.

Accordingly, the principal object of the present invention is the provision of snap-in lock or latch means applicable to retractor frames so that the complete latch assembly may be tilted into position in an automobile or vehicle.

Another object is to provide a retractor which avoids the reqirement for threaded fasteners in attachment to the vehicle.

Another object is to provide for a structurally supported pocket selectively located at body assembly in the vehicle bodies and which pockets tiltably and lockably receive the retractor in which release requires separate tripping of the latch.

Other objects including simplicity, economy, and utilization of stressing to assure complementing strength of attachment will be appreciated as the description proceeds and applicable to substantially all known retractors with simple modification of the frame and applicable to other retractor-like automotive accessories receiving stress from within the vehicle. Such a tilt-in structure is applicable also in installation of, for example, instrument panels and other accessory assemblies which are positioned and installed in a prepared pocket or receptacle.

GENERAL DESCRIPTION

In general, an accessory for internal automobile mounting such as a retractor involving preassembled elements is provided with pivot means on one side of the accessory frame and stop means on the other side. Adjacent to the stop means a latch element is provided which opens when the frame is tilted into a pocket or opening and closes behind an edge of the pocket or opening when the edge effectively engages the stop means. The latch cannot be freed by operative stressing of the accessory such as a pull on webbing extending from the retractor. However, for repair and replacement, the latch may be manually tripped using access through the opening of the pocket to the latch trip. Thus, a snap-in assembly is provided for automotive accessories such as retractors and, for example, instrument panels, which are secure, firm and stress resistant. The present invention is applicable by simple modifications in the frame and the provision of a relatively simple resilient latch without radical redesign of accessory units.

IN THE DRAWING

FIG. 1 is a perspective view of an automotive internally installed accessory shown as a seat belt retractor and including the snap-in features of the present invention.

FIG. 2 is a full partially schematic elevation section view through an automobile structure adjacent the roof rail and indicating the installation pocket and the retractor accessory of FIG. 1 positioned for tilting into the pocket and snapping in place.

FIG. 3 shows the retractor accessory fully snapped into the structure pocket shown in FIG. 2 and indicates the attachment of the upholstered cover plate and webbing guide.

SPECIFIC DESCRIPTION

Referring to the drawing and first with reference to FIG. 1 thereof, an automotive accessory is illustrated as a seat belt retractor 11 and comprises in general a frame member or mounting elements 12 which grasps and supports the necessary sub-assemblies. The frame 12, as shown, is in the form of a channel with two upstanding spaced-apart flanges 13 and 14 interconnected by a web portion 15. The flanges 13 and 14 provide sides which support the spool or reel 16 on which the seat belt webbing 17 is wound. A retracting bias is provided to the spool 16 by a spring retractor motor 18 contained within the housing 19. Details of the motor comprise no part of the present invention but it is helpful to appreciate that in retractors 11, the motor 18 acts on the spool 16 urging the pick-up of slack in the webbing 17 so that the spool 16 stores the webbing when not in use. The frame 12 journals the spool 16. The frame 12 also operably supports the lock mechanism 20 shown as pawl bar 21 resting in the pivot opening 22 provided in the flanges 13 and 14. The sensors which activate movement of the pawl bar 21 are not shown and form no part of the present invention but may comprise spring and gear mechanisms, inertially responsive devices and rotating blocking cams well known in the art. In the retractor 11, when the sensor urges or permits the pawl 21 to tilt toward the ratchet teeth 23 on the spool 16, further withdrawal of webbing is prevented.

It will be noted that thus far almost any frame 12 in any retractor 11 has been described. The frame 12 supports the selected mechanism depending on the desired retractor type and style. The present invention finds embodiment in the accessory retractor 11 in the pivot means 24 shown in the FIG. 1 in the groove 25 and 25' defined in the flanges 13 and 14, respectively and integral therewith. On the other side of the retractor frame 12 (side away from the side of the frame 12 having the groove 25-25') is a stop means 26 shown as stop lugs 27 and 27' extending outwardly from the frame 12 as integral extensions of the flanges 13 and 14. As will be seen, the frame shoulder 28, together with the latch 29, carries stress, after installation, into the relatively heavy frame 12.

The latch 29 is ramped on one side and the ramp 30 allows depression of the latch 29 opening the latch 29. Spring pressure urges the latch 29 toward the lock position shown in FIG. 1. The latch 29 as shown is a spring wire latch having the ramped portion 30 connected to a latch face portion 31 which runs parallel to the flanges 13 and 14 then is bent generally parallel to the shoulder 28 of the frame 12 and thence through the arcuate slot 32 and is then bent at 33 parallel to the place of the flanges 13 and 14 to insertion through the arcuate slot 32 and the terminal tab 35 provides a compression anchor in the slot 32. Thus, as the ramp 30 is engaged, the latch face 31 elevates and the anchor tab 33 rises in the arcuate slots 32. Then the latch 29 closes upon passing the obstruction.

In FIGS. 2 and 3 the operative environment of the present invention is shown by referencing the structure to the automotive body 40 shown internally of the roof rail 41 at the juncture of roof 42 and body panel 43 and taken at about a position of post 44 or other structurally reinforced portion of the body 40 or chassis.

The retractor accessory 11 is positioned as shown in FIG. 2 so that the pivot means 24 is pivotally engaged with the one edge 45 in a pocket 46 defined in the structural members and opposite another edge 47 which, as will be seen, is in clearance relation to the frame 12 until engaged the ramp 30 of latch or spring clip 29 and until engaging the stop means or buttress 26. As the frame 12 is tilted into the pocket 46, the latch 29 is opened to allow passage of the edge 47 of the pocket 46 and upon engagement of the edge 47 with the stop means 28, the latch 29 closes and the frame 12 is thereupon locked in position.

The locked position of the frame 12 inisde the pocket 46 is shown in FIG. 3. The latch 29 is locked over the edge 47 of the pocket 46 and the edge 47 rests firmly against the buttress. The edge 45 remains in groove 25-25' forming the pivot means 24. The thrust shoulder 28 of the frame 12 receives the stress on the retractor accessory 11 and dissipates the force into the structure parts 44 of the vehicle at the edge 47.

The flank portions of the structural parts of the automobile defining the pocket 46 with the edges 45 and 47 are not shown but are spaced-apart to provide a clearance fit of the retractor 11 into the pocket 46. A cosmetic trim cover 50 covers the pocket except for the guide entry element through which the webbing 17 is guided or selectively directed.

Having thus described a specific embodiment of the invention located at the roof rail of a vehicle, others will appreciate that the structure may be inverted as, for example, when located in a structural pocket at the floor-door rail or in a door or body point post and that such inversion and adaptation to particular angularity in mounting and positioning would not be a departure from the spirit of the invention where an accessory structure frame such as in a retractor is pressed into pivotal engagement with an edge of a structurally defined pocket and the structure is thereupon tilted into the pocket and snapped into position as the frame comes into stop engagement with the one of the edges of the structural cavity and is snapped into position with a latch closing on the edge in prevention of chance removal. It will also be understood that the latch 29 may be located as a part of the pocket 46 so as to grip the retractor frame 12 upon swing into the cavity or pocket 46. By reference to FIG. 3, if removal for repair or replacement is required, a tool is pressed into the opening, anchor tab 33 of the latch or spring clip 29 is lifted in the arcuate slot 32 and the latch 29 is thus opened and the frame 12 is tilted out on the pivot means 24.

The foregoing description is sufficiently complete as to provide those in the art to apply and use the invention herein and those skilled in the art will readily perceive changes, improvements and modifications and such changes, improvements and modifications are intended to be included within the scope of the present invention limited only by the scope of the hereinafter appended claims.

I claim:

1. An installation structure for automobile accessory assemblies such as retractors for safety belt webbing comprising:
   a mounting element holding an accessory assembly;
   pivot means provided in one side of said mounting element;
   a stop means provided in the other side of said mounting element;
   an accessory pocket defined by structural automobile parts and having one edge in pivot relation with said pivot means and having another edge in engagement with said stop means upon pivoting said frame on said pivot means and said one edge whereby said pivot means is first engaged at said one edge and said mounting element is then pivoted on said one edge to engagement of said stop means against said another edge of said accessory pocket; and
   resilient latch means secured to said mounting element adjacent said stop means and opening upon tilting said mounting element into said pocket by engagement with said another edge and closing behind said another edge at engagement of said stop means with the front of said another edge.

2. A installation structure for automotive accessories such as retractors for safety belt webbing comprising:
   a spool on which webbing is selectively wound and unwound;
   lock means selectively permitting and preventing withdrawal of said webbing from said spool;
   a retractor motor connected to said spool biasing said spool to the fully wound condition;
   a retractor mounting element journalling said spool and supporting said lock means and said retractor motor, said mounting element having integral extending lugs on one side thereof and a stop structure extending from the other side thereof;
   a resilient latch element operably supported by said mounting element and extending therefrom adjacent said stop structure and opening to permit swing access to said stop structure and closing thereafter in a latching motion; and
   a pocket defined by structural elements of an automobile having one edge first engageable with said lugs of said mounting element whereby said mounting element is pivotal on said one edge and another edge opposite said one edge of said pocket which depressingly engages said latch element to engagement with said stop structure of said mounting element and said latch element thereupon retaining said mounting element against removal behind said another edge.

3. A retractor for automotive webbing comprising:

a spool on which webbing is selectively wound and unwound;

lock means selectively permitting and preventing withdrawal of said webbing from said spool;

a retractor motor connected to said spool biasing said spool to the fully wound condition;

a channel shaped retractor frame having a webbing portion and two upstanding flanges, said flanges journalling said spool and supporting said lock means and said retractor motor, said frame having extending lugs integral with said flanges of said frame on one side of said frame and stop buttresses on the other side of said frame extending integrally from said flanges;

a resiliently biased latch element operably supported by said frame biased normally closed and in spaced adjacent relation to said stop buttresses and opening to permit pivotal swing access to said stop buttresses and thereafter closing in a latching motion; and a pocket defined by structural elements of a vehicle having one edge first engageable with said lugs of said frame whereby said frame is pivotal on said one edge and another edge spaced from and opposite said one edge of said pocket, said another edge in position to depress said latch element and upon engagement of said stop buttresses providing a barrier against which said latch closes.

4. In a snap-in retractor as set forth in claim 3 wherein said latch element is a spring clip configured for depression on interference movement toward said stop buttresses and supported in said frame.

5. In the combination as set forth in claim 4 wherein the latch element is a spring wire structure and one end of said spring wire structure is movable in a slot formed in said frame upon depression of said latch element and returnable after depression of said latch.

6. A retractor for automotive safety belt webbing and installed in a structural pocket provided in an automobile and comprising:

a pair of spaced-apart edges supported by structural members of an automobile and with said structural members defining a pair of perimeter entries to a pocket;

a retractor frame including a spool of webbing, a retractor motor, and selective lock means for said spool and said webbing and said frame having a groove in one side partially defined by integral extending lugs and said groove engageable with one of said spaced-apart edges of said pocket and said frame having a buttress on the other side engageable by the other of said edges of said pocket; and latch means operably supported by said frame and adjacent said buttress and opening to pass said other of said edges to contact with said buttress and said latch means closing behind said other of said edges securing said frame in said pocket and against said other edge, said lugs being first engaged with said one of said spaced-apart edges whereby said frame is pivotal to engage said other of said edges at said latch means and closing against said buttress, said latch means dropping behind said other of said edges in prevention of removal of said frame from said pocket.

7. In the combination structure of claim 6 wherein said latch element is a spring clip supported resiliently in said frame and closing on said other of said edges.

8. In the combination structure of claim 7 wherein access to said latch element is provided through said pocket and whereby manual opening of said latch is allowed for tilt-out removal of said frame.

* * * * *

UNITED STATES PATENT OFFICE

CERTIFICATE OF CORRECTION

Patent No. __4,167,277__　　　　　Dated __1979 September 11__

Inventor(s)　__Robert John Rumpf__

It is certified that error appears in the above-identified patent and that said Letters Patent are hereby corrected as shown below:

In the References Cited:

"Miller, et al", should read --- Mills, et al ---

Abstract, line 8, after "is" insert --- a ---

Abstract, line 12, after "retractor" insert --- frame is ---

Column 1, line 24, after "like" insert --- to ---

Column 2, line 38, change "elements" to read --- element ---

Column 3, line 23, change "slots" to read --- slot ---

Column 3, line 36, change "engaged" to read --- engaging ---

UNITED STATES PATENT OFFICE
CERTIFICATE OF CORRECTION

Patent No. 4,167,277      Dated 1979 September 11

Inventor(s) Robert John Rumpf

It is certified that error appears in the above-identified patent and that said Letters Patent are hereby corrected as shown below:

Column 3, line 43, change "inisde" to read --- inside ---

Column 3, line 62, after "body" delete "point"

Signed and Sealed this

Twenty-seventh Day of November 1979

[SEAL]

Attest:

RUTH C. MASON
Attesting Officer

LUTRELLE F. PARKER
Acting Commissioner of Patents and Trademarks